United States Patent
Gupta

(10) Patent No.: US 10,243,795 B2
(45) Date of Patent: *Mar. 26, 2019

(54) DNS FILE SETTINGS DEFERRAL

(71) Applicant: Go Daddy Operating Company, LLC, Scottsdale, AZ (US)

(72) Inventor: Nitin Gupta, Mountain View, CA (US)

(73) Assignee: GO DADDY OPERATING COMPANY, LLC, Scottsdale, AZ (US)

( * ) Notice: Subject to any disclaimer, the term of this patent is extended or adjusted under 35 U.S.C. 154(b) by 35 days.

This patent is subject to a terminal disclaimer.

(21) Appl. No.: 15/469,335

(22) Filed: Mar. 24, 2017

(65) Prior Publication Data

US 2017/0201417 A1 Jul. 13, 2017

Related U.S. Application Data

(63) Continuation of application No. 14/688,340, filed on Apr. 16, 2015, now Pat. No. 9,647,979.

(51) Int. Cl.
  *H04L 12/24* (2006.01)
  *H04L 29/12* (2006.01)
  *G06F 3/0484* (2013.01)

(52) U.S. Cl.
  CPC ............ *H04L 41/082* (2013.01); *H04L 41/22* (2013.01); *H04L 61/1511* (2013.01); *G06F 3/04842* (2013.01); *G06F 3/04847* (2013.01)

(58) Field of Classification Search
  CPC .......... H04L 61/1511; H04L 29/12066; H04L 67/10; H04L 61/2076
  See application file for complete search history.

(56) References Cited

U.S. PATENT DOCUMENTS

| | | | |
|---|---|---|---|
| 9,647,979 B2 * | 5/2017 | Gupta | H04L 61/1511 |
| 2010/0031078 A1 * | 2/2010 | Foote | H04L 29/12066 714/4.1 |
| 2014/0123264 A1 * | 5/2014 | Shull | H04L 63/08 726/7 |
| 2016/0140159 A1 * | 5/2016 | Gupta | G06F 17/30345 707/609 |
| 2016/0179629 A1 * | 6/2016 | Gupta | G06F 17/30876 707/649 |
| 2016/0308819 A1 * | 10/2016 | Gupta | H04L 61/1511 |
| 2017/0201417 A1 * | 7/2017 | Gupta | H04L 41/082 |

* cited by examiner

*Primary Examiner* — David R Lazaro
(74) *Attorney, Agent, or Firm* — Quarles & Brady LLP

(57) ABSTRACT

Systems and methods of the present invention provide for one or more server computers configured to: receive data encoding an update to a configuration setting in a DNS and an indication of an event deferring the update. After receiving the data and indication, the server(s) may: download, from a DNS server, a zone file comprising the configuration setting; modify the zone file using the update to generate a modified zone file comprising the update; determine, in accordance with the indication, whether the event has occurred; and if so, cause the DNS server to modify the zone file comprising the configuration setting in accordance with the modified zone file.

19 Claims, 8 Drawing Sheets

```
File Edit Tools         ⇐ ⇒ □
Domain Name Control Panel
    Edit the zone file for your domain name, example.com below:

$ORIGIN example.com. ;start of zone file in namespace
$TTL 1h ;default expiration time
example.com.  IN  SOA  ns.example.com. username.example.com. (2007120710 1d
2h 4w 1h)
example.com.  IN  NS   ns ; ns.example.com is a nameserver for example.com
example.com.  IN  NS   ns.somewhere.example.; backup nameserver
example.com.  IN  MX   10 mail.example.com. ; mailserver for example.com
example.com.  IN  A    192.0.2.1 ; IPv4 address for example.com
              IN  AAAA 2001:db8:10::1 ; IPv6 address for example.com
www           IN  CNAME example.com. ; www.example.com = alias for example.com
wwwtest       IN  CNAME www ; another alias for www.example.com
mail          IN  A    192.0.2.3 ; IPv4 address for mail.example.com
mail2         IN  A    192.0.2.4 ; IPv4 address for mail2.example.com
mail3         IN  A    192.0.2.5 ; IPv4 address for mail3.example.com

[ Deploy Zone File Now ]  [ Deploy Zone File Later ]  [ Request Approval ]
```

```
File  Edit  Tools          ⇐ ⇒ [                                              ]

Domain Name Control Panel
Original DNS settings for example.com    Updates to example.com in bold and underlined
                                         DNS updates scheduled to begin 2/28/15 at 3 PM

$ORIGIN example.com.                    $ORIGIN example.com.
  $TTL 1h                                 $TTL 24 h
  example.com.  IN                        example.com.  IN
  SOA ns.example.com.                     SOA ns.example.com.
  username.example.com.                   username.example.com.
  (2007120710 1d 2h 4w 1h)                (2007120710 1d 2h 4w 1h)
  example.com.                            example.com.
  IN   NS ns                              IN   NS ns
  example.com.                            example.com.
  IN   NS ns.somewhere.example            IN   NS ns.somewhereelse.example
  example.com.                            example.com.
  IN   MX 10 mail.example.com.            IN   MX 10 othermail.example.com.
  example.com.                            example.com.
  IN   A      192.0.2.1                   IN   A      192.0.5.2
  IN   AAAA   2001:db8:10::1              IN   AAAA   2001:db8:11::2
  www IN   CNAME example.com.             www IN   CNAME example.com.
  wwwtest IN   CNAME www                  wwwthistest IN   CNAME www
  mail   IN   A   192.0.2.3               mail   IN   A   192.0.2.3
  mail2  IN   A   192.0.2.4               mail2  IN   A   192.0.2.4
  mail3  IN   A   192.0.2.5               mail3  IN   A   192.0.2.5
```

FIG. 5

File  Edit  Tools

Domain Name Control Panel

Deferred Deployment Date:
To deploy at a later time, select the amount and the interval for the date on which to deploy the zone file:

Select a Date and Time:

| February ▽ | 28 ▽ | 3 ▽ | :00 ▽ | PM ▽ |

Select an Interval - Update the DNS Settings After:

| 3 ▽ | Weeks ▽ |

Have updates complete by this time ☐

Access Comparison Page to Review Changes to Original DNS File

FIG. 6

File Edit Tools

Domain Name Control Panel

DNS File Update Approval:
To request approval for the changes to the domain name zone file, please enter an email address or SMS number, or select an email address or customer id from the drop down below:

Email Address/SMS Number: | example@example.com |

Customer Contact/ID: | example@example.com ▽ |
example@example.com
example2@example2.com
customer id 1
customer id 2
customer id 3

Require approval from at least two users prior to updating DNS ☐

Access Comparison Page to Review Changes to Original DNS File

DNS FILE SETTINGS DEFERRAL

CROSS-REFERENCE TO RELATED APPLICATION

This application claims the benefit of U.S. patent application Ser. No. 14/688,340 titled "DNS FILE SETTINGS DEFERRAL," filed Apr. 16, 2015.

FIELD OF THE INVENTION

The present invention generally relates to the field of Domain Name System (DNS) records such as zone files and specifically to deferring the deployment and/or activation of a DNS record for a specific period of time, or until the DNS record is approved for deployment and/or activation.

SUMMARY OF THE INVENTION

The present invention provides systems and methods comprising one or more server computers communicatively coupled to a network and configured to: receive, from a client computer configured to receive, and transmit, via a network: data encoding at least one update to at least one configuration setting for a domain name in a domain name system (DNS); and an indication of an event deferring the at least one update; after receiving the data and the indication, the server(s) may be further configured to: download via the network, from at least one DNS server within the DNS, a zone file comprising the at least one configuration setting; modify the zone file using the at least one update to generate a modified zone file comprising the at least one update; determine, in accordance with the indication, whether the event has occurred; and responsive to a determination that the event has occurred, cause the at least one DNS server to modify the zone file comprising the at last one configuration setting in accordance with the modified zone file.

The above features and advantages of the present invention will be better understood from the following detailed description taken in conjunction with the accompanying drawings.

BRIEF DESCRIPTION OF THE DRAWINGS

FIG. 5 is an example embodiment including a user interface used in deferring the deployment and/or activation of a DNS record.

FIG. 6 is an example embodiment including a user interface used in deferring the deployment and/or activation of a DNS record.

FIG. 9 is an example embodiment including a user interface used in deferring the deployment and/or activation of a DNS record.

DETAILED DESCRIPTION

Figure 1:
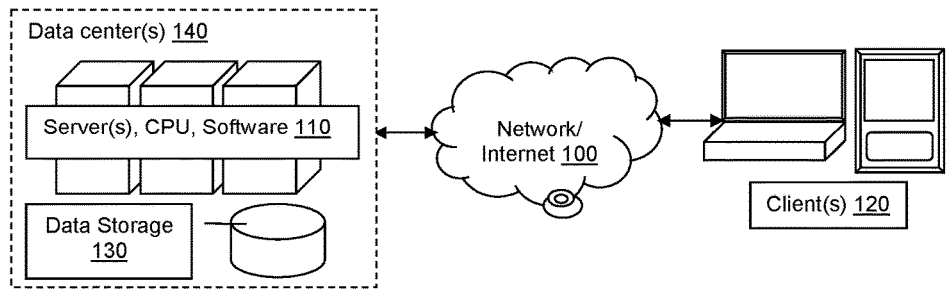
FIG. 1 illustrates a possible system for deferring the deployment and/or activation of a DNS record.

The present inventions will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers place multimedia information (e.g., text, graphics, audio, video, animation, and other forms of data) at specific locations on the Internet referred to as websites. The combination of all the websites and their corresponding web pages on the Internet is generally known as the World Wide Web (WWW) or simply the Web.

Prevalent on the Web are multimedia websites, some of which may offer and sell goods and services to individuals and organizations. Websites may consist of a single webpage, but typically consist of multiple interconnected and related web pages. Websites, unless extremely large and complex or have unusual traffic demands, typically reside on a single server and are prepared and maintained by a single individual or entity. Website browsers are able to locate specific websites because each website, resource, and computer on the Internet has a unique Internet Protocol (IP) address.

IP addresses, however, even in human readable notation, are difficult for people to remember and use. A Uniform Resource Locator (URL) is much easier to remember and may be used to point to any computer, directory, or file on the Internet. A browser is able to access a website on the Internet through the use of a URL. The URL may include a Hypertext Transfer Protocol (HTTP) request combined with the website's Internet address, also known as the website's domain name.

The DNS is the world's largest distributed computing system that enables access to any resource in the Internet by translating user-friendly domain names to IP Addresses. The process of translating domain names to IP Addresses is called name resolution. A DNS name resolution is the first step in the majority of Internet transactions. The DNS is a client-server system that provides this name resolution service through a family of servers called domain name servers. The hierarchical domain space is divided into administrative units called zones. A zone usually consists of a domain (e.g., example.com) and possibly one or more sub domains (e.g., projects.example.com, services.example.com). The authoritative data needed for performing the name resolution service is contained in a file called the zone file and the DNS servers hosting this file are called the authoritative name servers for that zone.

The DNS infrastructure consists of many different types of DNS servers, DNS clients, and transactions between these entities. An important transaction in DNS is the one that provides the core service of DNS (i.e., name resolution service) and is called the DNS query/response. A DNS query/response transaction is made up of a query originating from a DNS client (generically called a DNS resolver) and response from a DNS name server. In this way, the DNS serves as a global, distributed database. Name servers (serving zone files) each contain a small portion of the global domain space.

The DNS may be maintained by a distributed database system, which may use a client-server model. Specifically, clients may issue a query/request using a domain name and the DNS servers may receive the query/request originating from the client and resolve a domain name to an IP address for a website. The DNS may distribute the responsibility for assigning domain names and may map them to IP networks by allowing an authoritative name server for each domain to keep track of its own changes. Static addressing may be, but is not necessarily, used in some infrastructure situations, such as finding the DNS directory host that may translate domain names to IP addresses. Static addresses may also be used to locate servers or other network hardware inside a network environment A DNS file may comprise any configuration file used to configure the DNS for a specific domain name, website, email, etc. For example, a user may register a new domain name in preparation for launching a new website, and when the user is ready to set up the website they may want to update the domain name so that it no longer points to a coming soon web page, but rather directs Internet traffic to the landing page for the newly constructed website. As a non-limiting example, the DNS file may comprise a zone file for a specific domain name, as is known in the art.

It should be noted that the disclosed examples specifically demonstrate configuration settings for a DNS being updated, and possibly deferred, via edits and other updates to the configuration settings within a zone file for a zone file within the DNS associated with a domain name. However, this should not limit the scope of the present invention. As a non-limiting example, any of the updates to the configuration settings, and the possible deferral of these updates, could also be applied to configuration settings for one or more DNS name servers.

Applicant has determined that current methods of creating or updating a DNS file require a user to either make immediate changes to a zone file or to download a copy of the DNS file, make adjustments to the parameters (e.g., resource records) within the DNS file, and upload the edited DNS file to the appropriate DNS server(s) to initiate and propagate the changes.

In situations where the user makes instant changes to the DNS file, the user may access a control panel for the domain name, possibly via a domain name registrar's website, and request changes to specific parameters within the DNS file for the domain name. Once the user submits the changes, the DNS file may be used to instantly update the parameters and/or other DNS configuration settings, which may be initiated in the DNS and propagated to all DNS servers and other DNS architecture affected by the DNS file.

Applicant has determined that instant changes to a DNS file for a domain name limit the abilities of the user to delay the instantiation and propagation of the new DNS settings within the DNS. For example, if a user has hired a technical consultant to take care of the DNS setup for a website launch, but that technical consultant will not be available during the website launch, there is currently no way for the user to have the technical consultant confirm, in real time at the time of the website launch, that the DNS file is ready to use.

Situations where the user downloads, modifies and uploads the modified DNS file may comprise a type of offsite DNS. Applicant has determined that such situations may include a complex process, wherein the user. In essence, creates a whole new DNS file. Although this is a valid approach to any of the embodiments disclosed herein, any user applying this approach should use caution in making changes to the live DNS file within the DNS system, while also making changes to the downloaded DNS file. in such a situation, the two files may be out of sync, leaving the user with no choice by to upload the downloaded DNS file, thereby overwriting any changes made to the live DNS file since the download. The user would simply have to live with the changes made, hoping that nothing important was overwritten.

Applicant has therefore determined that optimal systems and methods comprise a single common DNS file within an environment configured to allow a user to defer activation of any modifications to the DNS settings according to a delayed timeline for activation or an approval by one or more additional users. Such systems and methods may employ means for the user to select to deploy or activate the changes within the single DNS file at a time later than the changes to the DNS file are made.

Such means may include some type of user input, such as input into the user interface(s) seen in FIGS. 4-6 and 8-9. In embodiments where the user is deferring the activation of the DNS modifications according to a delayed timeline, the interface(s), such as that seen in FIG. 6, may be configured to receive, from a user, a selection of a specific time (e.g., changes will occur on February 28 at 3 PM), or an amount of intervals (e.g., 3 hours, 3 days, 3 weeks, 3 months, etc.) after which to activate the modifications to configuration settings for the DNS file.

Thus, the disclosed system may be configured so that the specific DNS features are automatically applied on a date at a specific time, freeing up time for other matters. For example, in situations where a user, or another website developer on behalf of the user, is creating a new website, or if the website is already built and a new web page is being added to the website, the user may be testing the new web page(s) to determine if various features are operating correctly. The user may not want the page(s) available for public viewing until a specific date. However, on the date of a launch for the new web page, website or company, the user may not want to spend the time updating a DNS configuration, choosing instead to focus on the launch. This would also allow the user to ensure that all details of the DNS changes are applied correctly ahead of time, so that there are no surprises the day of the launch.

In embodiments where the user is deferring the activation of the DNS modifications according to an approval by one or more additional users, the interface(s), such as that seen in FIG. 9, may be configured to receive, from a user, a selection of an email address or user id. After receiving approval from the user contact, the system may activate the modifications to configuration settings for the DNS.

In addition, embodiments as disclosed herein may comprise means to continuously update configurations settings within the DNS file prior to the activation, so that any additional changes made between the original change and the activation of the modifications to the configuration settings are included and are activated at the same time.

Several different environments may be used to accomplish the method steps of embodiments disclosed herein. FIG. 1 demonstrates a streamlined example and FIG. 2 demonstrates a more detailed example of an environment including a system and/or structure that may be used to accomplish the methods and embodiments disclosed and described herein. Such methods may be performed by any central processing unit (CPU) in any computing system, such as a microprocessor running on at least one server 110 and/or client 120, and executing instructions stored (perhaps as scripts and/or software, possibly as software modules/components) in computer-readable media accessible to the CPU, such as a hard disk drive on a server 110 and/or client 120.

The example embodiments shown and described herein exist within the framework of a network 100 and should not limit possible network configuration or connectivity. Such a network 100 may comprise, as non-limiting examples, any combination of the Internet, the public switched telephone network, the global Telex network, computer networks (e.g., an intranet, an extranet, a local-area network, or a wide-area network), a wired network, a wireless network, a telephone network, a corporate network backbone or any other combination of known or later developed networks.

At least one server 110 and at least one client 120 may be communicatively coupled to the network 100 via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPPoE), and/or any combination thereof.

The example embodiments herein place no limitations on whom or what may comprise users. Thus, as non-limiting examples, users may comprise any individual, entity, business, corporation, partnership, organization, governmental entity, and/or educational institution that may have occasion to organize/import contacts and/or send marketing campaigns.

Server(s) 110 may comprise any computer or program that provides services to other computers, programs, or users either in the same computer or over a computer network 100. As non-limiting examples, the server 110 may comprise application, communication, mail, database, proxy, fax, file, media, web, peer-to-peer, standalone, software, or hardware servers (i.e., server computers) and may use any server format known in the art or developed in the future (possibly a shared hosting server, a virtual dedicated hosting server, a dedicated hosting server, a cloud hosting solution, a grid hosting solution, or any combination thereof) and may be used, for example to provide access to the data needed for the software combination requested by a client 120.

The server 110 may exist within a server cluster, as illustrated. These clusters may include a group of tightly coupled computers that work together so that in many respects they can be viewed as though they are a single computer. The components may be connected to each other through fast local area networks which may improve performance and/or availability over that provided by a single computer.

The client 120 may be any computer or program that provides services to other computers, programs, or users either in the same computer or over a computer network 100. As non-limiting examples, the client 120 may be an application, communication, mail, database, proxy, fax, file, media, web, peer-to-peer, or standalone computer, cell phone, personal digital assistant (PDA), etc. which may contain an operating system, a full file system, a plurality of other necessary utilities or applications or any combination thereof on the client 120. Non limiting example programming environments for client applications may include JavaScript/AJAX (client side automation), ASP, JSP, Ruby on Rails, Python's Django, PHP, HTML pages or rich media like Flash, Flex or Silverlight.

The client(s) 120 that may be used to connect to the network 100 to accomplish the illustrated embodiments may include, but are not limited to, a desktop computer, a laptop computer, a hand held computer, a terminal, a television, a television set top box, a cellular phone, a wireless phone, a wireless hand held device, an Internet access device, a rich client, thin client, or any other client functional with a client/server computing architecture. Client software may be used for authenticated remote access to a hosting computer or server. These may be, but are not limited to being accessed by a remote desktop program and/or a web browser, as are known in the art.

The user interface displayed on the client(s) 120 or the server(s) 110 may be any graphical, textual, scanned and/or auditory information a computer program presents to the user, and the control sequences such as keystrokes, movements of the computer mouse, selections with a touch screen, scanned information etc. used to control the program. Examples of such interfaces include any known or later developed combination of Graphical User Interfaces (GUI) or Web-based user interfaces as seen in the accompanying drawings, Touch interfaces, Conversational Interface Agents, Live User Interfaces (LUI), Command line interfaces, Non-command user interfaces, Object-oriented User Interfaces (OOUI) or Voice user interfaces. The commands received within the software combination, or any other information, may be accepted using any field, widget and/or control used in such interfaces, including but not limited to a text-box, text field, button, hyper-link, list, drop-down list, check-box, radio button, data grid, icon, graphical image, embedded link, etc.

The server 110 may be communicatively coupled to data storage 130 including any information requested or required by the system and/or described herein. The data storage 130 may be any computer components, devices, and/or recording media that may retain digital data used for computing for some interval of time. The storage may be capable of retaining stored content for any data required, on a single machine or in a cluster of computers over the network 100, in separate memory areas of the same machine such as different hard drives, or in separate partitions within the same hard drive, such as a database partition.

Non-limiting examples of the data storage 130 may include, but are not limited to, a Network Area Storage, ("NAS"), which may be a self-contained file level computer data storage connected to and supplying a computer network with file-based data storage services. The storage subsystem may also be a Storage Area Network ("SAN"—an architecture to attach remote computer storage devices to servers in such a way that the devices appear as locally attached), an NAS-SAN hybrid, any other means of central/shared storage now known or later developed or any combination thereof.

Structurally, the data storage 130 may comprise any collection of data. As non-limiting examples, the data storage 130 may comprise a local database, online database, desktop database, server-side database, relational database, hierarchical database, network database, object database, object-relational database, associative database, concept-oriented database, entity-attribute-value database, multi-dimensional database, semi-structured database, star schema database, XML database, file, collection of files, spreadsheet, and/or other means of data storage such as a magnetic media, hard drive, other disk drive, volatile memory (e.g., RAM), non-volatile memory (e.g., ROM or flash), and/or any combination thereof.

The server(s) 110 or software modules within the server(s) 110 may use query languages such as MSSQL or MySQL to retrieve the content from the data storage 130. Server-side scripting languages such as ASP, PHP, CGI/Perl, proprietary scripting software/modules/components etc. may be used to process the retrieved data. The retrieved data may be analyzed in order to determine the actions to be taken by the scripting language, including executing any method steps disclosed herein.

The software modules/components of the software combination used in the context of the current invention may be stored in the memory of—and run on—at least one server 110. As non-limiting examples of such software, the paragraphs below describe in detail the software modules/components that make up the software combination. These software modules/components may comprise software and/or scripts containing instructions that, when executed by a microprocessor on a server 110 or client 120, cause the microprocessor to accomplish the purpose of the module/component as described in detail herein. The software combination may also share information, including data from data sources and/or variables used in various algorithms executed on the servers 110 and/or clients 120 within the system, between each module/component of the software combination as needed.

A data center 140 may provide hosting services for the software combination, or any related hosted website including, but not limited to hosting one or more computers or servers in a data center 140 as well as providing the general infrastructure necessary to offer hosting services to Internet users including hardware, software, Internet web sites, hosting servers, and electronic communication means necessary to connect multiple computers and/or servers to the Internet or any other network 100.

Figure 2:
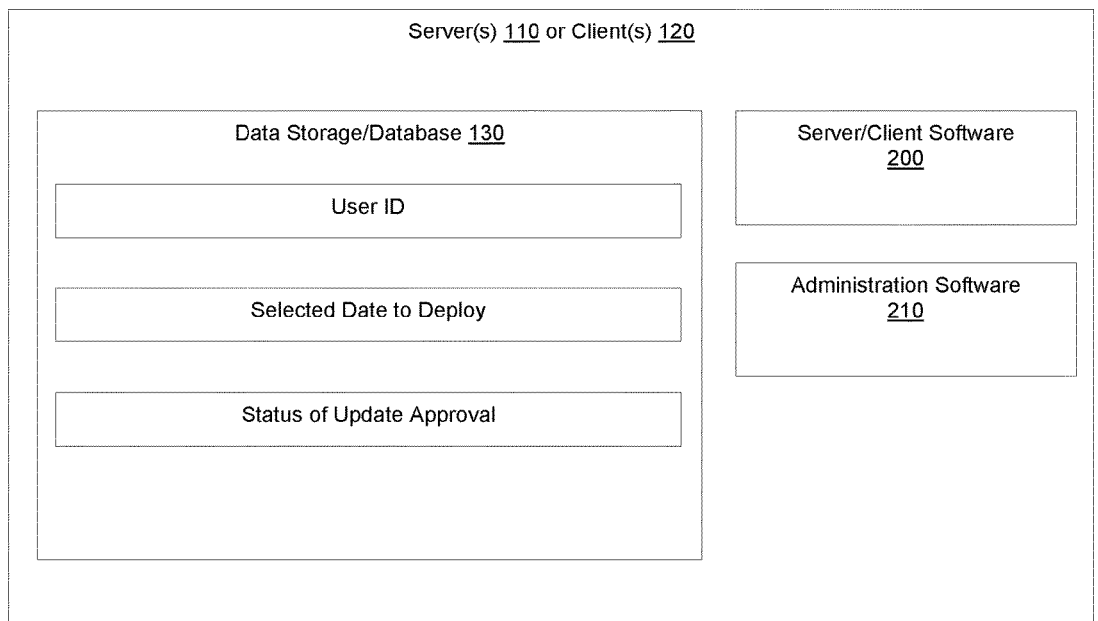
FIG. 2 illustrates a more detailed possible system for deferring the deployment and/or activation of a DNS record.
Figure 3:
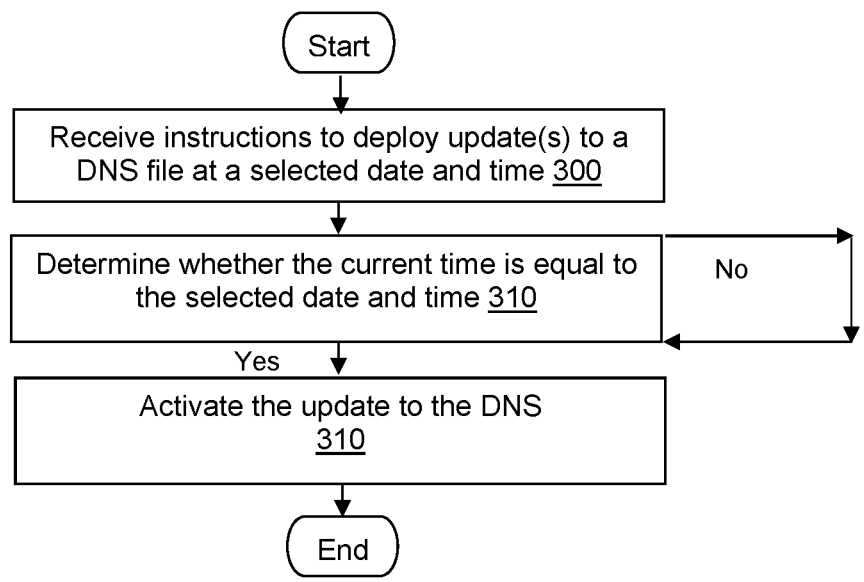
FIG. 3 is a flow diagram illustrating a possible embodiment of a method for deferring the deployment and/or activation of a DNS record.

FIG. 2 shows a more detailed example embodiment of an environment for the systems, and for accomplishing the method steps, disclosed herein. As non-limiting examples, all disclosed software modules 200 may run on one or more server(s) 110 and may include one or more user interfaces generated by the server(s) 110 and transmitted to and displayed on the client(s) 120. The user interface(s) may be configured to receive input from the user and transmit this input to the server(s) 110 for the administration and execution of the software 200, using data in data storage 130 associated with the software modules 200. Thus, the disclosed system may be configured to execute any or all of the method steps disclosed herein.

Server(s) 110 may be hosted by any entity, possibly a hosting provider, a domain name registrar, a website development company, any other software service provider or any combination thereof. To manage users of such a system, including individuals or organizations, server(s) 110 may host and run a user administration program 210 such as GODADDY's MY ACCOUNT control panel for management of hosting and domain names, as a non-limiting example.

In such an administration control panel program, or admin 210, each user may be assigned a user id. This user id may identify transactions performed by each user. These transactions may be stored as data records in data storage 130, each data record including the user id to associate the user with the transaction in data storage 130.

The data records may also store contact data for each user, possibly including email, SMS, social media account data, etc. to contact the user for any contact purposes disclosed herein. In some embodiments, the user may select specific contacts as a means of contact for purposes of receiving notice as disclosed in the current invention.

The admin 210 may include a Domain Control Center (DCC) for administration of domain names registered to the user. As non-limiting examples, the DCC may include means for listing and managing all domain names registered to the registrant, possibly including auto renewal of the domains, DNS record settings, etc. In some embodiments, the DCC may be used to display the disclosed notices, reports and/or domain name purchase offers, as described in more detail herein.

As seen in FIGS. 4-6 and 8-9, the disclosed system may comprise a client computer 120 configured to display a control panel for management of domain names. This domain name control panel may be generated by server(s) 110, and may comprise means to update the DNS zone file according to any means of DNS updates known in the art.

Figure 4:
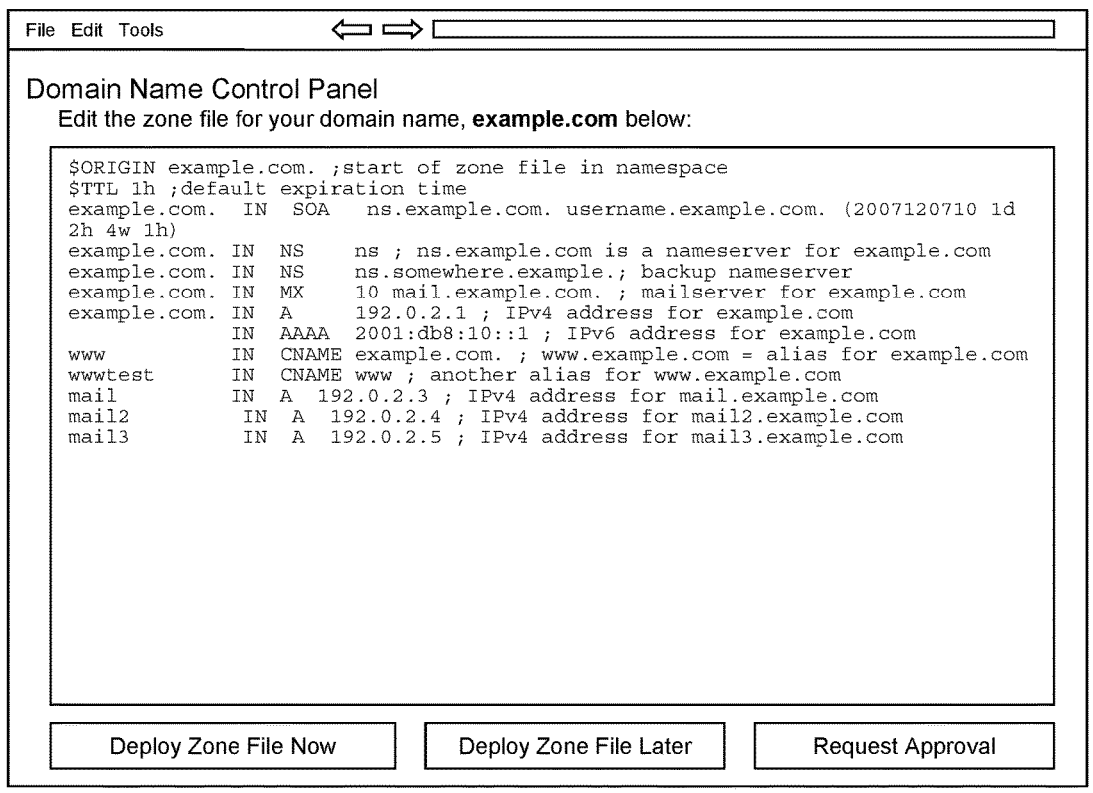
FIG. 4 is a flow diagram illustrating a possible embodiment of a method for deferring the deployment and/or activation of a DNS record.
Figure 7:
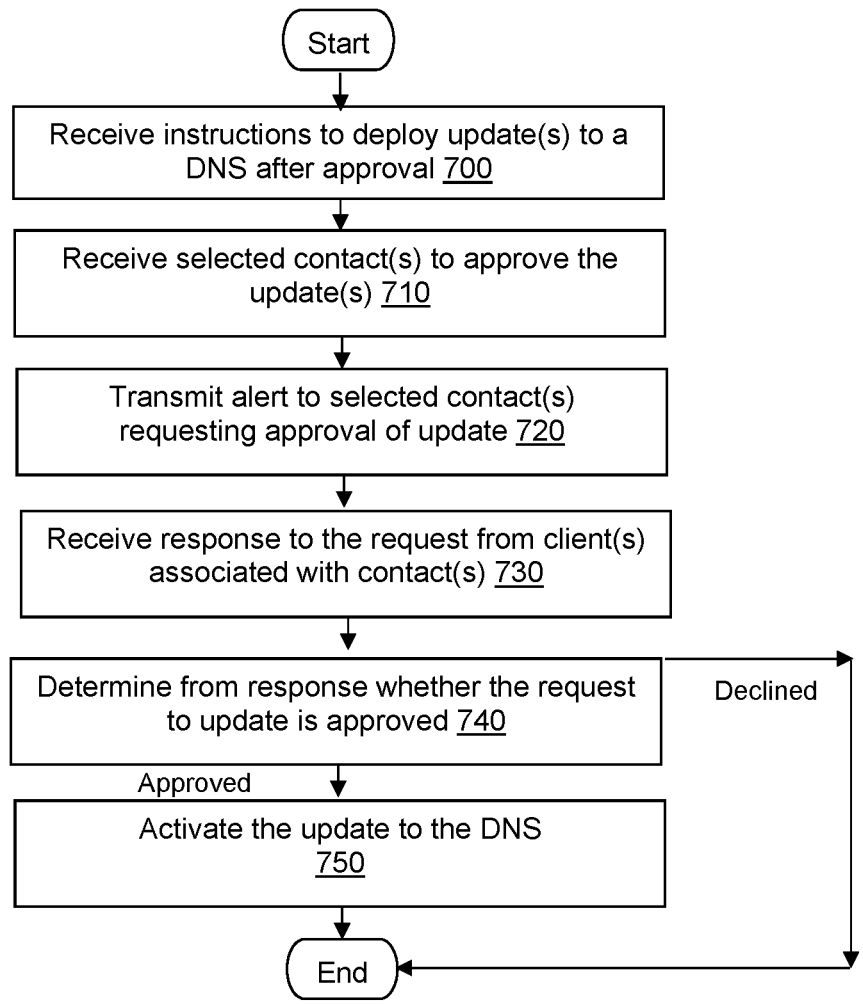
FIG. 7 is a flow diagram illustrating a possible embodiment of a method for deferring the deployment and/or activation of a DNS record.
Figure 8:
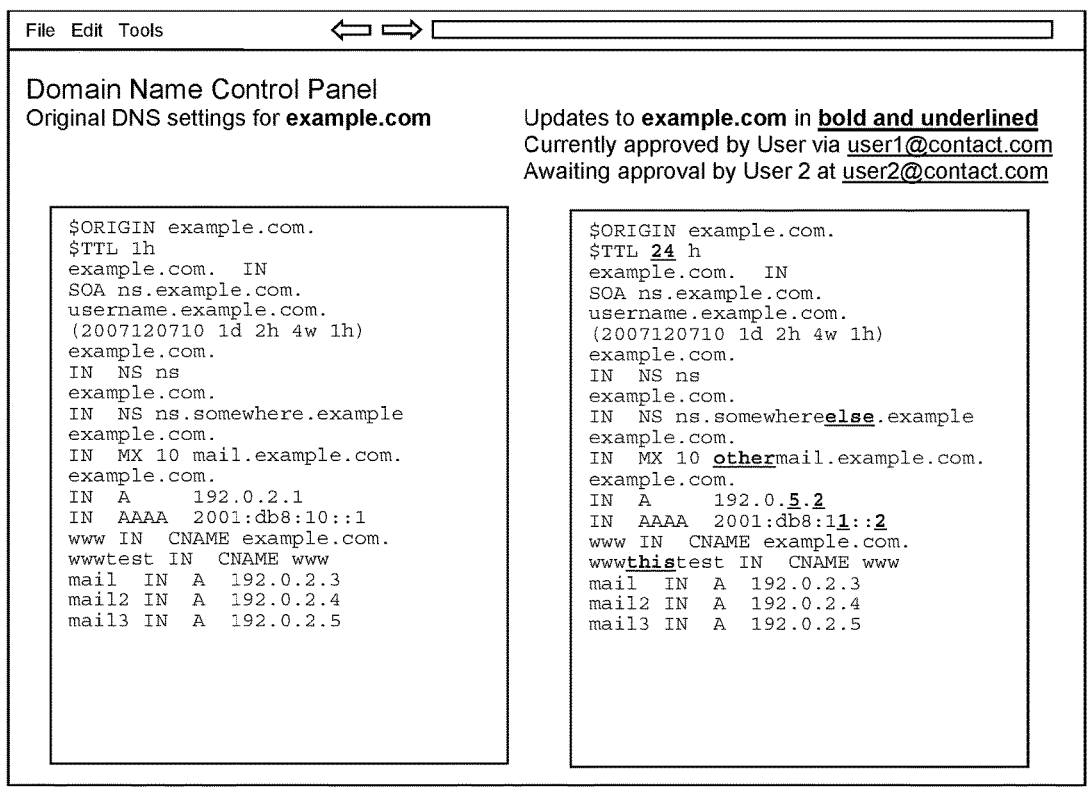
FIG. 8 is an example embodiment including a user interface used in deferring the deployment and/or activation of a DNS record.

In the non-limiting example interfaces shown in FIGS. 4, 5 and 8, server(s) 110 may access a copy of the zone file via the DNS and may generate a user interface control including a displayed copy of the DNS file. In some embodiments, the user may be creating and/or configuring the DNS file for the first time, possibly during or after the registration of the domain name.

The user interface may be configured to receive any edits to the DNS configuration from the user via the presented interface and file. FIG. 4 shows the zone file for the domain name example.com, presented in an editable interface text area. The example shown in FIG. 4 shows several example DNS settings/parameters, resource records, etc. within the zone file for example.com. However, this should in no way limit the scope of the disclosed invention, which may modify any configuration setting within the DNS.

Furthermore, any DNS file editing interface may be used to modify the configuration settings. For example, GODADDY's MY ACCOUNT administrator interface comprises a user interface allowing a user to edit any DNS file parameters, such as resource records, individually, so that each element of the DNS file or setting comprises its own individual GUI interface.

As seen in FIG. 4, the user interface(s) may comprise one or more user interface controls for initializing and propagating the changes to the DNS file immediately, and/or one or more user interface controls for deferring the initialization and propagation of the DNS file updates. Any user interface control, as described herein, may be used for the user to select these options.

The example interface in FIG. 4 includes buttons for the user to select options to apply the changes immediately, schedule a time during which to save/defer the updates for a future deployment, and/or request a review/approval of the updates. For embodiments where the user selects to initialize and propagate the changes to the DNS file immediately, the DNS and all related configurations may be updated according to techniques known in the art.

However, for embodiments where the initialization and propagation of the DNS files are to be deployed later, server(s) 110 may be configured to receive the request to deploy the DNS file changes later, and in response, download and store, in data storage 130, a copy of the DNS file as of the date that the updates to the configuration settings were requested. This copy of the DNS file may be used for comparison/diff purposes, as described below. An example data record for the DNS file may comprise a unique id, an association with the domain name for which the DNS file is configured, the text of the DNS file, and the date and/or time that the DNS file was saved, possibly comprising the date and time that the request for the DNS file update was received.

Client(s) 120 may be configured to receive, from one or more users via the user interface(s), edits to the DNS file, and may be further configured to transmit these edits to server(s) 110. Server(s) 110 may be configured to receive the edits to the DNS file and store these edits in data storage 130 in association with the domain name controlled by the DNS file. An example data record for each of the DNS file edits may comprise a unique id, an association with the unique DNS file id or the domain name for which the DNS file is configured, the edit to the DNS file, and the date and time the request for the DNS file update was received, etc. In some embodiments, the DNS file that includes the edits may be stored in data storage, in others, each edit to the configuration and/or the parameters of the DNS file may be stored individually.

Server(s) 110 may be configured to run a diff utility for identifying and displaying the differences between the original DNS file (i.e., the DNS file copied and stored when the updates were requested) and the edits to the DNS file made by the user, possibly via the user interface. The diff utility may comprise a data comparison tool for comparing the original DNS file and the updated DNS file (and/or the individual edits to the updated DNS file) and calculating the differences between the two files. This calculation may be line oriented, resource record oriented and/or oriented according to any DNS configuration parameters or settings within the DNS file. The diff utility may then try to determine the smallest set of deletions and insertions required to create one file from the other.

As seen in FIGS. 5 and 8, server(s) 110 may be further configured to use the data generated from the diff utility in order to generate a user interface displaying the difference between the original DNS file and the updated DNS file including the edits made by the user. The generated user interface may display the changes made in a standard format, such that both humans and machines can understand the changes and apply them, so that given one file and the changes, the other file can be created, if needed.

FIGS. 5 and 8 display a user interface for comparing the changes made to the DNS file. In this example embodiment, the comparison may comprise two windows. The first window may comprise a visual display of what is currently live in the DNS file. The second window may comprise the DNS file including the domain name changes stored in the database. To accomplish this, the software may generate and/or access a version of the DNS file as it currently exists. The software may then access the database comprising the updates made to the DNS file. The software may then replace the existing portions of the DNS file with the edits stored in the database.

In embodiments such as that seen in FIGS. 5 and 8, the software may be configured to highlight the edited portions of the DNS file for comparison purposes. Any means of highlighting these edits may be used. As non-limiting examples, these highlights may include: bolding, underlining, italicizing, generating a background highlight color, displaying in a different font color, displaying in a different font size, etc.

As seen in FIG. 5, the user interface may, in embodiments where the updates are deferred until a later date and time, further comprise a notice to the user of the date and time that the revisions will go live. (e.g., 3:00 PM on the 28th of February). As seen in FIG. 8, the user interface may, in embodiments where the updates are deferred until the update is approved, further comprise a notice to the user of which contacts have responded (as well as the status of their response), as well as any contacts that have not yet responded.

In embodiments where the original DNS file and the updated DNS file are stored as individual data records, the diff utility may also be used to generate data records for each individual diff. These data records may comprise any of the described data record characteristics associated with the DNS file described herein. In order for server(s) 110 to initiate and propagate the changes to the DNS via the configurations in the DNS file, the data records for the updates to the DNS file may be selected from data storage 130. Server(s) 110 may then extract and identify, from the data within the data records, the changes to be made to the DNS file.

A list of these changes may then be used to generate a queue of configuration changes to be made to the DNS file. Server(s) 110 may then initiate the configuration changes to the DNS via the updated DNS file by integrating the configuration changes into the DNS file, and may propagate the configuration changes throughout the DNS.

To accomplish this, server(s) 110 may be configured to generate and store a queue of at least one ready process comprising the at least one update, and may schedule the at least one ready process to run and execute at the selected date and time, or responsive to the at least one contact approving the at least one update.

As noted above, the interface for modifying the DNS file configuration may comprise one or more user interface controls for deferring the initialization and propagation of the DNS file updates. The non-limiting example interface in FIG. 4 includes two options for deferring the configuration changes. On receiving the user interface selection requesting scheduling a later time for future deployment or getting a review/approval, client(s) 120 may be configured to transmit the edits made to the DNS file to server(s) 110.

In response to receiving the selection of the appropriate user interface control, server(s) 110 may be configured to generate a user interface for the deferred deployment date and/or time. In some embodiments, the user interface(s) may be pop open or slide in windows. FIG. 6 shows a non-limiting example interface for scheduling a future deployment of the configuration changes. The example user interface in FIG. 6 comprises two options for the user to select the date and time the changes to the DNS configuration will be initialized and propagated.

The Select a Date and Time option may comprise a series of user interface controls configured to receive, from a user, a date and time that the DNS file changes should become activated. The Select an Interval option may include a similar series of user interface controls allowing a user to select an interval (e.g., minutes, hours, days, weeks, months, etc.) and a number of these intervals after which to initialize and propagate the edits within the DNS file.

As seen in FIGS. 6 and 9, the user interface may be configured to display a user interface control for accessing the comparison interface disclosed In FIGS. 5 and 8 respectively. In some embodiments, the date and time of the change to be made shown in FIG. 6 may be passed to the comparison interface in FIG. 5, and may be displayed so that the user knows when the updates will take effect.

In some embodiments, such as that seen in FIG. 6, the user may clarify whether the date and time selected to activate the DNS file revisions represents a date and time to begin propagating across the DNS, or whether the DNS file propagation should be completed by that time. In these embodiments, the user may have the flexibility to choose either way, but in some embodiments, the default may be to begin the propagation at the selected time. In some embodiments, a system administrator may choose one or the other options without giving the user a choice.

The interface(s) may be transmitted to, and displayed on, the client(s) 120, and may receive, from the user, the selection of the date and/or time that the updates to the DNS file will occur (possibly determined from the Select an Interval interface). This date and/or time, after being received from the user, may be transmitted to server(s) 110. Server(s) 110 may be configured to receive, from the user interface, the date and time to activate the changes to the DNS file, and may store the date and time in the database in association with the domain name and/or DNS file.

Server(s) 110 may compare the received and stored date and time (possibly determined by the selected number of intervals) with a current time to determine if changes in the DNS file should be activated. To accomplish this, server software 200 may be configured to determine the current time, possibly via a now( ) function in the software.

The server(s) 110 may then identify each DNS file edit, possibly as data records stored in data storage 130, to determine the date and time the update to the DNS file should take place. The server software 200 may then compare the date and time for the update with the current time, and if they are equal, the changes to the DNS file may be activated. To activate these changes, the updates to the DNS file may be merged with the existing live DNS file. In some embodiments, the updates to the DNS file may be merged prior to the date and time to update the DNS file.

During the time period between the user entering the date and time to activate the changes in the DNS file and the date of execution, the user may continue to make updates to the DNS file. These updates may be logged in data storage 130 as described above, then all updates during this time period may be simultaneously incorporated into the DNS file.

As noted above, the interface for modifying the DNS file configuration may comprise one or more user interface controls for deferring the initialization and propagation of the DNS file updates. The non-limiting example interface in FIG. 4 includes two options for deferring the configuration changes.

In addition to the option to delay activation of the DNS configuration changes via DNS file edits until after a particular date and time, another option, as seen in FIG. 9, may include a user interface control for requesting, from one or more additional users, an approval of the DNS file changes.

In response to receiving the selection of the appropriate user interface control, such as those seen in FIG. 4, server(s) 110 may be configured to generate a user interface for the approval, such as those seen in FIG. 9. In some embodiments, these may be pop open or slide in windows. FIG. 9 shows a non-limiting example interface for scheduling a deployment of the configuration changes based on approval. The example user interface in FIG. 9 comprises two options for the user to select the users that will approve the changes to the DNS configuration.

The Email Address/SMS option may comprise a series of user interface controls configured to receive, from a user, a contact data for the user they want to approve the DNS file edits. The Customer Contact/ID option may include a similar series of user interface controls for accessing a list of additional users from whom to request approval of the DNS file edits. In some embodiments, these users may be selected from a user list, possibly populated by the contact information associated with administration software 210.

As seen in FIGS. 6 and 9, the user interface may be configured to display a user interface control for accessing the comparison interface disclosed above and seen in FIGS. 5 and 8. The additional users selected may be passed to the comparison interface and may be displayed so that the user knows which users will be reviewing the changes and which have approved the changes, if applicable.

The interface(s) may be transmitted to, and displayed on, the client(s) 120, and may receive, from the user, the selection of the email address(es) and/or customer accounts to which to send an alert to approve the changes to the DNS file. Client(s) 120 may then be configured to transmit the selected data to server(s) 110.

Server(s) 110 may be configured to receive the selected additional users, and identify their associated contact information. Where the user entered an email address or SMS number, this contact data itself may be used to send the alert. However, If the user selected a user account id, server(s) 110 may be configured to identify a contact data in data storage associated with the selected user account id, such as an email address, an SMS number, or access to a user control panel for the user account.

Server(s) 110 may be configured to store the contact and/or user id in association with the domain name and/or DNS file and may generate a flag in the database that the DNS changes have not yet been approved. In some embodiments, the database record for the request may further comprise an open ended date.

In some embodiments, the user may create a pull request to be sent to the selected additional user(s), alerting them that the DNS file is ready for approval. The pull request may comprise a request to collaborate on the changes made to the DNS file. These changes would be made in the proposed changes file, not to the current live DNS file. Effectively, the pull request would indicate that the user is ready to submit the changes, and request someone else to approve the pull request To accomplish this, server(s) 110 may send an alert, possibly via the identified contact or to be displayed on a control panel for the associated customer account, putting the additional user(s) on notice that an approval is needed before the DNS file updates will be implemented. In some embodiments, the additional user(s) may have installed software or other means of displaying the alert for the approval. The alert may include a link or other user interface control to access an interface analogous to that seen in FIGS.

5 and 8. This interface may allow the additional users to review the changes made to the original DNS file and approve or deny the changes.

In some embodiments, the one or more additional users may review the request for changes to the DNS file, and upon their approval, the flag in data storage 130 may be updated to reflect that the changes have been approved. The approval of the one or more additional users may be displayed using the interface disclosed in FIG. 9, showing the differences between the original and the edited DNS file, or may send an alert to the original user via a contact for the original user, or via a control panel, etc.

In some embodiments, the interface may be read only, so that the user may view and or approve the differences, but may not make changes. In other embodiments, the additional users may be able to edit the changes before approving them. In some embodiments, possibly those that are read only, the approval may be binary. The request to get approval may initiate the approval process, where the additional user(s) may either come back in and approve or decline the DNS edit. In these embodiments, if the request is accepted, the DNS file may be updated and merged. If the additional user(s) deny the request, the DNS file may revert back to the original versions and the changes may be thrown out. In some embodiments, the user may continue to make changes and continue to submit approval requests until the DNS file is approved by the additional user(s).

Upon approval, the changes may be applied to the DNS file, unless the user has designated that the release of the DNS file is both approval and time based, as described below.

The request for approval from one or more additional users may further be broken down into requesting a review to make sure there are no errors in the DNS file changes, effectively acting as a code review of the DNS file, or requesting a review as a security feature to make sure no single bad actor can make malicious changes to the DNS, effectively creating a two-factor authentication.

In some embodiments, the additional users may be acting in a technical support function, so the user may ask a technical consultant to review the file to make sure all technical aspects are in order before going live. In some embodiments, both the user and the additional user(s) may be technically savvy. In these embodiments, the user may submit the changes to DNS as part of a peer DNS review process similar to a code review process before the changes to the DNS file go live.

In some embodiments, requiring approval by the additional user(s) may comprise a security feature similar to a 2 factor authentication. Two different people's approval may be required before the updates to the DNS file may take effect, thereby requiring DNS changes to have 2 different people's credentials to approve.

During the time period between the user entering the request to approve changes in the DNS file and the review by the one or more additional users, the user may continue to make updates to the DNS file. These updates may be logged in data storage 130 as described above, then all updates during this time period may be incorporated into the DNS file simultaneously.

In some embodiments, any combination of scheduling the changes to the DNS file and requesting approval for the changes may be used. As a non-limiting example, a user may schedule the changes in the DNS file to take effect on a particular date at a particular time, however, these changes may only take effect if an approval has been received from the additional user(s). Likewise, an approval may be received from the additional user(s), but will only go into effect after the time period has elapsed, or the selected date and time arrives.

Once the date to apply the changes to the DNS file is set and/or the approval has been received, the software may recognize the conditionals have been met, and may generate and store (and move into software for execution) a queue of the changes to be deployed at the set date/time and/or after approval.

A list of these changes may then be used to generate a queue of configuration changes to be made to the DNS file. Server(s) 110 may then initiate the configuration changes to the DNS via the updated DNS file by integrating the configuration changes into the DNS file, and may propagate the configuration changes throughout the DNS.

To accomplish this, server(s) 110 may be configured to generate and store a queue of at least one ready process comprising the at least one update, and may schedule the at least one ready process to run and execute at the selected date and time, or responsive to the at least one contact approving the at least one update.

The embodiments disclosed above comprise a comparison of a selected date and time with a current time and/or a determination of whether an approval has been received prior to updating a DNS (possibly via transmission and configuration of an updated DNS file to the appropriate DNS servers), as a significant event which defers the activation of an update to at least one configuration setting in a DNS. However, these example embodiments should not limit the scope of events that may defer the activation of these updates.

DNS files and the configuration settings within the DNS files may have many additional applications within the current state of the art, and may be applied to the current invention. As non-limiting examples, a user may register a new domain name in preparation for launching a new website. In related embodiments, a user may update the DNS file so that a domain name points from a first website to a second website, such as from a coming soon type web page to a landing page of a newly constructed website. The event that activates the DNS updates may include any event updating the domain name so that it no longer points to a coming soon web page, but rather directs Internet traffic to the landing page for the newly constructed website.

For example, control panels or other user interfaces, as well as their corresponding server software, may be configured to identify a specific web page, (e.g., main.asp, index.php, etc.), that, when uploaded to a host server, activates the zone file update, or, for example, re-routes the Domain name to point from a coming soon web page to the new specific web page. Likewise, deleting the coming soon web page may automatically activate a change to point the DNS file to the main.asp, index.php, etc. page for the website.

Conversely, in some embodiments, a user may be closing down a business associated with the website and therefore taking down the website as well. The user may therefore select to have the DNS records reflect the website going down at a specific time. In these embodiments, deletion of all web page files in the website's directory on the server may automatically delete or overwrite all zone file resource records pointing to the IP address for the website. In some embodiments, the IP address may then be automatically configured to point to a default "this site is no longer available" web page.

Similarly, in some embodiments, the user may update the DNS file to point the domain name from the IP address for the servers originally hosting the website to the IP addresses for the servers of the new website host, such as GODADDY. In these embodiments, the event that activates the DNS update may include deleting the files from the original website host servers and/or copying the files to the new host servers and/or generating new web page or other files on the new host servers. Any of these example events, and the insertion or deletion of detected web pages for these sites, may signal the disclosed system that the event has occurred.

Additional embodiments may include a user forwarding website requests for the website to a personalized page for a social media account. The user may update the DNS records so that the website requests no longer forward to the personalized page for the social media account, but instead point to the original website, or a specific page therein. In some embodiments, the MX records within the DNS record may be pointing to a specific office application, such as Microsoft's OFFICE 365. The user may want to update the MX records so that the user's email is moved over to a different office application such as GOOGLE APPS.

Additional embodiments may include the event being affected by unrelated websites or current events. As non-limiting examples, the event for launching the company website may be correlated to a first appearance of the company name on a stock exchange website. The detection of the company's stock within the stock exchange website may be the activating event that causes the company's website to go live on the Internet. In a related example, the activating event may comprise a politician's website. A news feed and/or additional detections of keywords around the politician announcing their decision to run may be the activating event that causes the politician's campaign website to go live.

The steps included in the embodiments illustrated and described in relation to FIGS. 1-9 are not limited to the embodiment shown and may be combined in several different orders and modified within multiple other embodiments. Although disclosed in specific combinations within these figures, the steps disclosed may be independent, arranged and combined in any order and/or dependent on any other steps or combinations of steps.

Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:

1. A system, comprising a hardware server computing device coupled to a network and comprising at least one processor executing specific computer-executable instructions within a memory that, when executed, cause the system to:
decode, from a graphical user interface (GUI) displayed on a client hardware computing device coupled to the network:
a configuration update to be applied to a domain name system (DNS); and
an event data defining an event after which to activate the configuration update;
access a zone file stored on a DNS server within the DNS;
modify the zone file to include the configuration update; and
responsive to an occurrence of the event, activate the configuration update within the DNS server.

2. The system of claim 1 wherein the event comprises:
a current date and time matching a date and time input into the GUI;
an approval decoded from a second client hardware computing device operated by a user whose contact data is decoded from the GUI and stored in a database coupled to the network.

3. The system of claim 1, wherein the specific computer-executable instructions further cause the system to decode a selection from the GUI to:
immediately activate the configuration update; or
defer activation of the configuration update until after the occurrence of the event.

4. The system of claim 1, wherein the GUI displays at least one event definition GUI control receiving user input defining the event.

5. The system of claim 1, wherein the GUI displays at least one configuration update GUI control receiving user input defining the configuration update.

6. The system of claim 1, wherein the specific computer-executable instructions further cause the system to:
run a diff utility identifying a difference between an original zone file and the zone file modified to include the configuration update; and
generate a user interface comprising:
a first display of the original zone file;
a second display comprising the zone file modified to include and highlight the configuration update; and
a status of the event.

7. The system of claim 1, wherein the specific computer-executable instructions further cause the system to store in association, in a database coupled to the network:
a copy of the zone file downloaded from the DNS server;
the configuration update; and
the event data.

8. The system of claim 1, wherein the specific computer-executable instructions further cause the system to:
generate and store a queue of at least one ready process comprising the configuration update; and
automatically schedule the at least one ready process to run and execute after the event.

9. The system of claim 1, wherein the specific computer-executable instructions further cause the system to:
decode, from the GUI, an additional configuration update; and
activate the additional update responsive to the occurrence of the event.

10. A system, comprising at least one hardware server computing device coupled to a network and comprising at least one processor executing specific computer-executable instructions within a memory that, when executed, cause the system to:
detect the occurrence of an event defined within an event data decoded from a graphical user interface (GUI) displayed on a client hardware computing device coupled to the network;
modify a zone file stored on a domain name system (DNS) server within a DNS to include a configuration update decoded from the GUI; and
activate the configuration update.

11. A method, comprising:
    detecting, by a server hardware computing device coupled to a network and comprising at least one processor executing specific computer-executable instructions within a memory, the occurrence of an event defined within an event data decoded from a graphical user interface (GUI) displayed on a client hardware computing device coupled to the network;
    modifying, by the server hardware computing device, a zone file stored on a domain name system (DNS) server within a DNS to include a configuration update decoded from the GUI; and
    activating, by the server hardware computing device, the configuration update.

12. The method of claim 11 wherein the event comprises:
    a current date and time matching a date and time input into the GUI;
    an approval decoded from a second client hardware computing device operated by a user whose contact data is decoded from the GUI and stored in a database coupled to the network.

13. The method of claim 11, further comprising the step of decoding a selection from the GUI to:
    immediately activate the configuration update; or
    defer activation of the configuration update until after the occurrence of the event.

14. The method of claim 11, further comprising the step of displaying, by the GUI, at least one event definition GUI control receiving user input defining the event.

15. The method of claim 11, further comprising the step of displaying, by the GUI, at least one configuration update GUI control receiving user input defining the configuration update.

16. The method of claim 11, further comprising the steps of:
    running, by the server hardware computing device, a diff utility identifying a difference between an original zone file and the zone file modified to include the configuration update; and
    generating, by the server hardware computing device, a user interface comprising:
        a first display of the original zone file;
        a second display comprising the zone file modified to include and highlight the configuration update; and
        a status of the event.

17. The method of claim 11, further comprising the step of storing, by the server hardware computing device, in association, in a database coupled to the network:
    a copy of the zone file downloaded from the DNS server;
    the configuration update; and
    the event data.

18. The method of claim 11, further comprising the steps of:
    generating and storing, by the server hardware computing device, a queue of at least one ready process comprising the configuration update; and
    automatically scheduling, by the server hardware computing device, the at least one ready process to run and execute after the event.

19. The method of claim 11, further comprising the steps of:
    decoding, by the server hardware computing device, from the GUI, an additional configuration update; and
    activating, by the server hardware computing device, the additional update responsive to the occurrence of the event.

* * * * *